Figure 1:
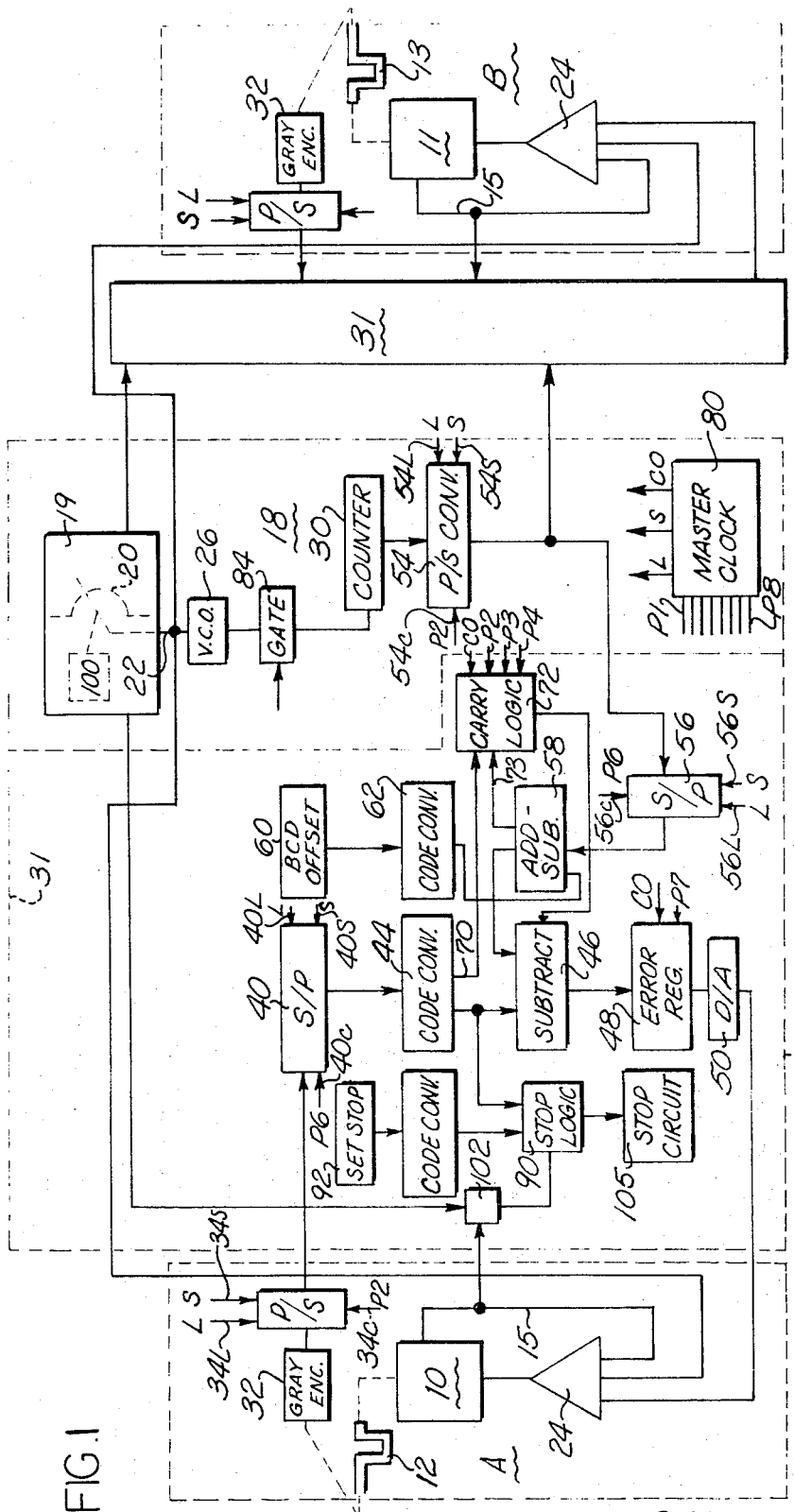

United States Patent [19]
O'Callaghan

[11] 3,764,868
[45] Oct. 9, 1973

[54] SYNCHRONIZING PLURAL MOTOR CONTROL SYSTEM FOR MACHINES

[75] Inventor: Gerald F. O'Callaghan, Kenosha, Wis.

[73] Assignee: Eaton Corporation, Cleveland, Ohio

[22] Filed: June 10, 1971

[21] Appl. No.: 151,845

[52] U.S. Cl................ 318/85, 318/78, 318/602
[51] Int. Cl. .............................................. H02p 5/00
[58] Field of Search ................. 318/70, 77, 78, 85, 318/600, 601, 602, 603

[56] References Cited
UNITED STATES PATENTS

| | | | |
|---|---|---|---|
| 3,064,173 | 11/1962 | Breen et al. | 318/85 X |
| 3,549,948 | 12/1970 | Joeschke | 318/85 X |
| 3,675,098 | 7/1972 | Heilberger | 318/85 |
| 2,775,727 | 12/1956 | Kernahan et al. | 318/601 |
| 3,600,655 | 8/1971 | Karlin | 318/78 X |
| 3,218,532 | 11/1965 | Toscano | 318/603 |

Primary Examiner—T. E. Lynch
Attorney—Yount & Tarolli

[57] ABSTRACT

Control circuit for synchronizing machines in which a master velocity signal for controlling speed of machines is also converted to provide a repeating digital master phase cycle which is compared with a digital number from an absolute encoder on each machine for indicating machine position and to develop an error signal to synchronize the machines to the master cycle. Offsetting means is operable to change the phase relationship of the machine to the master cycle and stop means for stopping the machines in a phase relation to the master cycle which is different from the operating phase relationship.

19 Claims, 2 Drawing Figures

PATENTED OCT 9 1973   3,764,868

INVENTOR
GERALD F. O'CALLAGHAN
BY Yount and Tarolli
ATTORNEYS

SYNCHRONIZING PLURAL MOTOR CONTROL SYSTEM FOR MACHINES

The present invention relates to control systems for electrically synchronizing the phase of stamping presses or other machines.

When machines are electrically synchronized to operate in a specific phase relationship, the control system must have accurate information as to the instantaneous positions of the machine and the information must be handled in a manner to maintain the accuracy of the information. Moreover, when stamping presses or similar machines are being synchronized, the system must accommodate itself to loads which vary widely during each machine cycle. In addition to the foregoing consideration, it is desirable that the phase of the synchronized machines relative to each other be changeable. Moreover, for stamping presses, as well as various other machines, it is desirable that the machines be stopped in their open positions even though they have different relative phase relationship when synchronized.

In one known system disclosed in Jaeschke U.S. Pat. No. 3,549,948, pulse generators driven by the machines being synchronized count position counters and the positions of two machines are compared with each other to determine whether or not the machines are operating in synchronizm in proper relationship. The master signal in the Jaeschke patent is used to determine the velocity of a master machine and the other machines are operated as slaves from the position counter for the master machine.

In accordance with one aspect of the present invention, a novel and improved electrical control system for synchronizing machines or mechanisms is provided, which electrical control system accurately determines the positions of the mechanisms or machines to be synchronized and reliably effects control of their speed of operation to maintain the machines in synchronism with each other and with a master signal, even though the machines are located at distances from one another and have loads which vary between light and heavy during a machine cycle.

In accordance with another aspect of the present invention, a new and improved electrical control circuitry enables the phase relationship of a machine or mechanism with respect to the master cycle to be readily changed.

In accordance with another aspect of the present invention, a master control signal is converted to a machine cycle signal to indicate the time of the phases of a master machine cycle and this signal is compared with a position signal for each machine being synchronized to develop an error signal which controls the operation of each machine or mechanism being synchronized.

Another aspect of the present invention is the use of absolute position encoders to provide the position signal for the machine, with the control circuitry being such that the computing circuit for determining the error signal for operating the machine being synchronized may be located remote from the machine and the position encoder without requiring a large number of parallel lines to transmit the parallel data from the position encoder to the computing circuitry.

The circuitry of the present invention further provides control circuitry in which the adverse effects of pulses due to noise, etc., is minimized.

A still further aspect of the present invention is to provide a new and improved control system in which a plurality of machines are synchronized to a master cycle signal digitally representing the phase of a master cycle to maintain a predetermined phase relationship therewith, the system being such that the phase of any machine relative to the master cycle can be readily changed.

Figure 2:
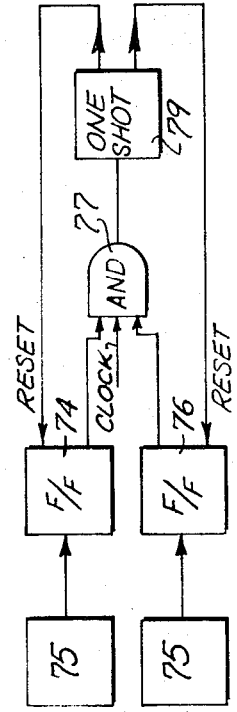

Further aspects and advantages of the present invention will be apparent from the following description of the preferred embodiment of the invention, made with reference to the accompanying drawing, in which:

FIG. 1 is a schematic circuit diagram, in block form, of the control system; and FIG. 2 is a sub-block diagram of a portion of FIG. 1.

Referring to the drawings, stamping presses A, B to be synchronized are respectively driven at speeds determined by velocity control circuits 10 and 11 for driving crank shafts 12, 13 for presses A, B, respectively. The velocity control circuits 10, 11 include motors for driving the shafts 12, 13, respectively, and means for providing velocity feedback signals over feedback lines 15, there being one feedback line for each of the velocity control circuits.

The operation of the machines to be synchronized is controlled from a master control circuit 18. The master control circuit 18 includes mode control circuitry 19 for selecting and controlling the mode of operation of the machines. The mode control circuitry includes a potentiometer 20 which may be set to provide, on an output 22, a master analog signal whose magnitude determines the velocity of operation of the machines being synchronized. The output 22 for the analog control signal is connected directly to one input of a respective summing amplifier 24 for each of the velocity control circuits 10, 11. The outputs of the summing amplifiers 24 are connected to the respective velocity control circuit to effect operation of the corresponding machine at a speed which is dependent upon the magnitude of the output signal of the summing amplifier. The velocity feedback from the velocity control circuits over lines 15 is applied to one input of the corresponding summing amplifier 24 to oppose the master analog control signal.

The master control unit also includes means for converting the master analog control signal to establish a master machine cycle in which the instantaneous phase of the master machine cycle is indicated digitally. This is accomplished in the illustrated embodiment by converting, in a voltage-to-frequency converter 26, the master analog control signal on output 22 from an analog signal to a pulse train which has a frequency dependent upon the magnitude of the analog signal. Pulses from the voltage-to-frequency converter 26 are counted by a master phase counter 30 which automatically resets itself when it reaches a count which corresponds to the phase subdivisions of the desired master machine cycle. Consequently, the number of the counter 30 indicates the phase of the master cycle.

To synchronize the machines driven by the drive shafts 12, 13 with the master cycle, the phase of the master cycle es compared, by a position error computer 31 for each machine, with the phases of the machines. The drive shafts 12, 13 each drive an absolute position encoder 32 which indicates the phase of the machine within its machine cycle. It is to be understood that the period of the machine cycle is to correspond to the period of the master cycle indicated by the master phase counter 30.

The absolute position encoders 32 may be a conventional encoding device having a plurality of binary code zones driven from the shafts 12, 13 to encode the angular position of the shafts. The finest binary zone defines the resolution of the encoder and the position encoder is preferably of the type which changes in only one digit for each incremental change of the position number. One type of code which operates in this manner is known as a Gray code. The output of the Gray code will be a parallel output of a plurality of binary signals which, when decoded, will indicate the position or phase of the machine. An advantage of such an encoder is that it absolutely indicates machine position and does not rely on an accumulation technique as in the case of a pulse counter.

Since the synchronization of each machine is the same, the description shall proceed with respect to machine A, it being understood that the synchronizing controls are duplicated for the machine B.

In accordance with one aspect of the present invention, the signals from the encoding device 32 set the stages of a parallel-to-serial converting circuit 34. The parallel-to-serial converting circuit 34 may conveniently comprise a shift register whose stages are set in accordance with the parallel output of the encoding device 32 when a signal is applied to a load input 34L, and a clock signal appears on a clock input 34c. The number registered in the shift register 34 when it is loaded is transmitted to the position error computer, or synchronizing circuit, for the machine, by applying pulses to the clock input 34c and a shift signal S to the shift input 34s to shift the information out of the register in a serial manner.

The position error computers for the machines being synchronized are preferably located remote from the machine being controlled at a central location for all error computers.

The use of serial transmission from the register 34 to the position error computer 31 for the machine eliminates the need for the large number of lines which would be required to effect a parallel transmission between the encoding circuitry on the machine and the remote position error computer. The position error computer 31 includes a register 40, which may be a conventional shift register, for receiving the serial information from the encoder parallel-to-serial register 34. The register 40 has a load input 40L which effects a resetting of the register stages when a load signal L is applied thereto and a clock signal is on an input 40c and a shift input 40s which will effect a shifting of the information in the register when a signal is applied thereto and a clock signal appears on the clock input 40c. After the encoding shift register 34 has been loaded from the encoder 32, a shift signal is applied to the shift input 34s of the shift register 34 and as clock signals are then applied to the input 34c, the information in the shift register 34 is serially transmitted to the input of the shift register 40. As the information is received in the first stage of the shift register 40, it is shifted one stage by a shift signal on input 40s and a clock signal on the input 40c. The signal on the clock input 40c of register 40 is delayed with respect to the input on the clock input 34c of register 34 to allow time for the pulse to be transmitted to the shift register 40 and for the input stage of the shift register to be set.

When the position information has been shifted from the shift register 34 to the shift register 40, the phase position in the register 40 is compared with the phase position set in the master phase counter 30 to determine if there is an error in the position of machine A. Since the number registered in shift register 40 is a position number in the Gray code and since a number in the Gray code cannot be conveniently manipulated arithmetically, the Gray code is converted in a conventional Gray to natural binary code converter 44 before it is applied to one of the parallel inputs of subtract circuit 46. The subtract circuit 46 compares the output of the Gray to binary converter 44 with the master phase position and if there is an error in the phase position of machine A, the subtract circuit 46 will have an output which is stored in an error register 48. One bit of the information which is stored in the error register 48 will be a sign bit to indicate whether the error is positive or negative. The error register 48 is connected to a digital-to-analog converter 50 whose output has a polarity and magnitude dependent upon the magnitude of the number stored in the error register 48 and a polarity dependent upon the sign in the error register. The output of the digital-to-analog converter circuit 50 is applied to the error input of the summing amplifier 24 for machine A to effect a change in the speed of the machine A to bring about a phase correction.

As described above, the position number of the machine being controlled is compared with the phase position indicated by the master position counter and a correction made in the speed of the machine to bring the phase in correspondence if there is an error. To minimize the number of connections needed between the master phase counter 30 and the subtract circuit 46, the phase number registered in the counter 30 is converted from parallel to serial form in a circuit 54. The parallel-to-serial circuit 54 may be a conventional shift register having a load input 54L for effecting the setting of the stages of the shift register in accordance with the position number in the phase counter 30 when a load signal L is applied to the input 54L and a clock signal P2 is also applied to a clock input 54c.

After the register 54 has been loaded, the information in the register may be shifted from the register serially by applying a shift signal S to the shift line 54s and clock signals to the clock input 54c. Each time a clock signal is applied to the input 54c when there is a shift signal on the input 54s, the information in the shift register is shifted one stage and the information in the last stage is transmitted to the input of a serial-to-parallel converting circuit 56. The serial-to-parallel converting circuit 56 has a load input 56L, which is used for resetting the register, a shift input 56s, and a clock input 56c. The register 56 operates in the same manner as the register 40 and its description will not be repeated.

The stages of the shift register 56 are connected in parallel to the parallel input of an add or subtract circuit 58, hereinafter sometimes referred to as an adder, for adding or subtracting a phase offset for the machine A. If the machine A is to be operated out of phase with the master cycle, the phase difference is set in a plurality of offset switches 60 which are preferably set-up to code the number in binary coded decimal form. The number set in the switches 60 is converted to a weighted binary coded number by a code converter 62 and the number from the code converter 62 is added or subtracted by the circuit 58 from the phase position registered in the register 56 to provide a modified master phase position. Whether the offset is added to or subtracted from the master position is determined by a setting of one of the switches 60 and this, in turn, is transmitted as a bit of information through the code converter 62 to the add or subtract circuit 58.

In operation, the circuitry described is clocked at a rate such that at the maximum operating speed of the machines, at least one comparison of phase position is made for each phase position indicated by the Gray encoder at the machine.

It will be appreciated that after each machine revolution and after each master cycle, the digital number representing the phases of the machine and the digital number representing the phase of the master cycle will reach a maximum and start again from zero and that unless a carry is effected, the revolution is lost and the digital number will only represent that phase of the machine within a single revolution. This presents no problem after both the machine being synchronized and the master cycle have completed their cycles. However, before both cycles are completed, if the machine is leading or lagging the master cycle, the carry digit to the adder circuit should be maintained until both the machine and the master cycle have completed their revolutions or the subtract circuit will have an erroneous reversal in magnitude of the numbers being subtracted. After both the machine and master cycle have completed their cycle, the carry digit may be deleted.

Accordingly, in accordance with one aspect of the present invention, circuitry is included to register a carry after each revolution of the master cycle and of the machine cycle and to hold the carry as the most significant bit until both the master cycle and the machine cycle have completed their cycles. To this end, the code converter 44 has a carry output 70 to provide a signal to carry logic circuit 72. The signal on the line 70 indicates that the machine A has completed a machine cycle and is starting the next machine cycle. A similar carry output 73 occurs from the add or subtract circuit 58.

The carry logic circuit 72 receives the carry signal from circuit (see FIG. 2) in the code converter 44 and in the add or subtract circuit 58 when the number at the output of the circuits indicates that a cycle has been completed and a new cycle is starting. The carry pulses may be derived by AND gating which provides the signal at a certain count or number at the output of the circuits 44, 58.

The carry logic circuit includes a carry flip-flop 74 activated by the carry signal from the circuit 58 and a flip-flop 76 set by the carry signal from the code converter 44. When either of these flip-flops is set, an appropriate signal is applied to the subtract circuit to maintain the circuit functioning properly, that is, the larger number will remain the most significant digit until the other carry flip-flop is set and a clock signal is applied to an AND gate 77. At this time, the AND gate 77 is operated to trigger a one-shot multivibrator 79 and effect a resetting of the flip-flops.

As will be recognized, circuitry for performing an adding operation or a subtracting operation with two numbers where it is necessary to determine which of the two numbers is larger and to provide a sign output is known to those skilled in the art and no detailed description thereof is required to understand or practice the present invention.

In the preferred and illustrated embodiment, a master clock is used to clock the flow of information in the system. Such a master clock is schematically illustrated in FIG. 1 and has been designated by the reference numeral 80. The master clock comprises a master oscillator which drives a chain of flip-flops to provide phase shifted signals indicated as P1–P8 on the left-hand side of the clock. The phase signals P1–P8 are phase shifted by one pulse and, accordingly, the frequency of the clock signals P1–P8 is one-eighth that of the master oscillator.

The master clock also has circuitry for deriving a load signal L, a shift signal S, and a compute signal CO. Ten clock pulses P1 constitute a timing frame and the load signal L appears between the first and second P1 pulses, the shift signal S between the second and ninth pulses, and the compute signal CO between the ninth and tenth pulses. the compute signal is used to condition the error register 48 to store the output of the subtract or difference circuit 46 when the register is clocked by the P7 signal. The load and shift control signals are used in the same manner. That is, the existence of the load signal or the shift signal, together with a clock signal, will activate the function. As indicated in FIG. 1, the P2 signal is used to clock the parallel-to-serial converter 34, the P6 signal is utilized to clock the serial-to-parallel converter 40, the difference in phase being such as to compensate for system delays. Similarly, the other phase signals are indicated on other circuits. The phase signals indicated for the carry circuit are used to clock information from the code converter 48 and from the add or subtract circuit 58 into the carry circuit and also to clock the resetting of the flip-flops in the carry circuit.

Various circuits may be used to convert the analog line speed signal to a frequency for counting the master phase counter 30. In a preferred embodiment, the pulses from a voltage controlled oscillator are applied to the input of a gate 84 which has another input connected to the output of the master oscillator of the master clock so that it is pulsed at a relatively high rate. The gate is of the type which will transmit one clock pulse for each of the pulses from the voltage controlled oscillator. By using this type of pulsing for the master counter 30, the leading edges of the pulses applied to the counter are synchronized with the clock signals from the master clock. This simplifies control problems.

In the preferred embodiment, provision is made to stop the synchronized machines at predetermined positions. Each of the synchronized machines is preferably provided with a stop logic circuit 90 which has one input from the code converter 44 and a second presettable input which may be preset by corresponding stop switches 92. When a stop of the synchronized machines is initiated, the mode control circuit will effect a deceleration of the synchronized machines by automatically reducing the line speed signal. Preferably, the mode control circuit includes a control 100 for gradually reducing the velocity signal to zero for stopping purposes. A circuit 102 at each machine is enabled from the mode control circuit 19 on stopping. The circuit 102, when enabled, monitors the velocity feedback signal from the machine and when the speed of the machine falls below a predetermined reference, enables the stop-logic circuit to stop the machine. When the speed has been reduced below a predetermined minimum, a signal is provided to stop-logic circuit 90 to enable the stop-logic circuit to compare the position of the machine with that set in the stop switches and when these are the same, to render the summing amplifier ineffective to drive the machine, and to activate circuit 105 to effect the application of the brake to effect a stopping of the machine at the position on the stop switches. This enables all of the machines to be stopped at phases which may be different from their relative phases when synchronized with the master cycle. When synchronizing stamping presses, this enables all the stamping presses to be stopped in an open position, even though they may be out of phase with each other when synchronized with the master cycle.

From the foregoing, it can be seen that in the described embodiment, the phase positions of the machines being synchronized are indicated absolutely and accumulated errors due to lost pulses, etc., are not a problem. Moreover, serial transmission of the data from the machines to the centrally located error computers eliminates the need for a larger number of information lines. Also, the phases of the synchronized machines are easily adjusted and the machines can be stopped in phase positions different from their relative positions during operation.

What is claimed is:

1. A control system for synchronizing the work cycles of a plurality of cyclic machines, each of said machines to be operated through a plurality of work cycles at a desired speed and to be synchronized in a predetermined phase relationship with respect to each other, means providing an analog velocity signal for controlling the speed of operation of said machines to operate said machines at said desired speed, individual velocity control means responsive to the velocity signal for driving each of said machines at a speed which is a function of the velocity signal including means for receiving an error signal input for modifying the velocity of the respective machine in response to said velocity signal, electrical means independent of said machine to be synchronized and responsive to said velocity signal to electrically convert said velocity signal to master phase signals representing subdivisions of a master cycle and to a frequency which varies cyclically with time as a function of the magnitude of the velocity signal, the instantaneous magnitude of said master phase signals indicating the instantaneous phases of the master machine cycle to which said machines are to be synchronized, encoding means driven by each machine to be synchronized and providing a machine position signal indicating the instantaneous phase of the respective machine in its work cycle, comparing means for comparing the machine phase signals from a machine with the master phase signals and providing an error signal to the said input of said velocity control means for the machine to change the speed of the machine to compensate for deviations in phase, said encoding means comprising an absolute position encoder, presettable means for stopping said machine at a predetermined phase position comprising a stop position different from the synchronized phase position, and stop control means for comparing said stop position and the machine phase signals and providing a control signal to effect a stopping of the machine at a phase relative to the master cycle different from the synchronized phase, said stop control means comprising means controlled by the speed of said machine for rendering said stop control means effective.

2. A control system according to claim 1 wherein said encoding means comprises an absolute position encoder.

3. A control system as defined in claim 1 wherein said comparing means includes means for receiving said master phase signals and modifying the magnitude of the master phase signals with which the phase signal of the machine is compared to introduce a phase offset in the mechanism being synchronized.

4. A control system according to claim 3 wherein said encoding means comprising an absolute position encoder having a plurality of binary zone tracks.

5. A control system as defined in claim 1 wherein said electrical circuit means for providing a master phase signal comprises a voltage-to-frequency converting circuit for providing a signal of a frequency which is a function of the velocity signal and a master counter for counting said signal frequency, the count of the counter indicating the phase of the master cycle.

6. A control system as defined in claim 5 including offset means for modifying the magnitude of the master phase position signal with which the machine phase signal is compared.

7. In a control system as defined in claim 6 wherein said offset means is a circuit for adding or subtracting a predetermined count from the count in said master counter.

8. A control system as defined in claim 1 wherein said machine encoding means provides parallel binary signals for indicating phase and comprises means for converting parallel information from the encoding means to serial information for transmission to the said comparing means, said comparing means including means for converting serial information from said machine to parallel information.

9. A control system as defined in claim 1 wherein said master phase signal and said machine phase signal are digital and said comparing means comprises a circuit for determining the difference between said machine phase signal and said master phase signal and includes means for establishing a carry for each of the signals at the end of a cycle and for maintaining the carry as a part of the phase signal until both the machine and master cycles have been completed.

10. In a control system for synchronizing the operation of a cyclic machine to a reference, first means repetitively providing successive master binary coded digital phase signals indicating successive phases of a single master machine cycle, and coding means driven by said machine and providing successive binary coded digital phase signals representing successive phases of one cycle of the machine, means for comparing the master binary coded digital phase signals and the machine binary coded digital phase signals to determine the error in synchronization of the phase of the machine with respect to the phase of the master cycle, means responsive to said comparing means to bring the machine into synchronism with the master machine cycle to maintain a fixed phase relationship between the machine cycle and the master cycle, and means for changing the fixed phase relationship of the machine cycle to the master cycle comprising an adding circuit for algebraically adding a predetermined increment to one of said phase signals, the output of said adding circuit being connected to said comparing means to be compared with the other of said phase signals to provide said error signal.

11. A control system as defined in claim 10 in which said comparing means comprises a circuit for determining the difference between said machine phase signal and said master phase signal and includes means for establishing a carry for each of the signals at the end of a cycle and for maintaining the carry as a part of the phase signal until both the machine and master cycles have been completed.

12. A control system according to claim 10 wherein said encoding means comprises an absolute position encoder having a plurality of binary zone tracks.

13. A control system as defined in claim 12 wherein said encoding means comprises means for registering bits from said binary zone tracks in parallel and for transmitting said bits serially to said comparing means, said comparing means including means for receiving said bits in a serial manner and converting said bits to parallel form.

14. A control system as defined in claim 2 wherein said encoding means comprises binary zone tracks and means for registering bits from said binary zone tracks in parallel and for transmitting said bits serially to said comparing means, said comparing means including means for receiving said bits in a serial manner and converting said bits to parallel form.

15. A control system for synchronizing the work cycle of a cyclic machine to a reference, means providing a velocity signal for controlling said machine, velocity control means responsive to the velocity signal for driving said machine at a speed which is a function of the velocity signal comprising means for receiving an error signal for modifying the velocity of the machine, electrical circuit means responsive to said velocity signal to electrically convert said velocity signal to master phase signals which vary with time and whose magnitude indicates the instantaneous phase of a master machine cycle to which said machine is to be synchronized, encoding means driven by each machine and providing a machine position signal indicating the instantaneous phase of the respective machine in its work cycle, presettable means settable to a predetermined phase position for stopping said machine at the phase position, and stop control means for comparing said stop position and the machine phase signals and providing a control signal to effect a stopping of the machine at a phase relative to the master cycle different from the synchronized phase.

16. A control system as defined in claim 15 wherein said encoding means comprises an absolute position encoder.

17. In a control system for synchronizing the operation of a cyclic machine to a reference, first means providing successive master digital phase signals indicating successive phases of a master machine cycle, encoding means driven by said machine and providing successive digital signals representing successive phases of the machine cycle, means for comparing the master digital phase signals and the machine phase signals to determine the error in synchronization of the machine with respect to the master cycle, means responsive to said comparing means to bring the machine into synchronism with the master machine cycle, presettable means presettable to a stop position for stopping said machine at a predetermined phase position, and stop control means for compariing said stop position and the machine phase signals and providing a control signal to effect a stopping of the machine at a phase relative to the master cycle different from the synchronized phase.

18. A control system as defined in claim 17 wherein said stop control means comprises means controlled by the speed of said machine for rendering said stop control means effective.

19. A control system for synchronizing the phase of work cycles of a plurality of cyclic machines, each of said machines to be operated through a plurality of work cycles at a single desired speed and to be synchronized in a predetermined fired phase relationship with respect to each ohter, meaans providing an analog velocity signal for controlling the speed of operation of said machine to operate said pluarlity machines at one desired speed, individual velocity control means responsive to the velocity signal for driving each of said machines at said one speed which is a function of the velocity signal including means for receiving an error signal input for modifying the velocity of the respective machine in response to said velocity signal, electrical means independent of said machines to be synchronized and responsive to said velocity signal to electrically convert said velocity signal to binary coded master phase signals representing subdivisions of a master cycle and to a cycle frequency which varies cyclically with time as a function of the magnitude of the velocity signal, the instantaneous magnitude of said master phase signals indicating the instantaneous phases of the master machine cycle to which said machines are to be synchronized, encoding means driving by each machine to be synchronized and providing a binary coded machine phase signal indicating the instantaneous phase of the respective machine in its work cycle, and comparing means for comparing the machine phase signals from each of the machines with the master phase signals and providing an error signal to the said input of the velocity control means for the machine to change the speed of the machine to compensate for deviations in phase to maintain a fixed phase relationship between the operating cycle of the machine and the cycle of the master phase signals.

* * * * *

UNITED STATES PATENT OFFICE
CERTIFICATE OF CORRECTION

Patent No. 3,764,868     Dated October 9, 1973

Inventor(s) Gerald F. O'Callaghan

It is certified that error appears in the above-identified patent and that said Letters Patent are hereby corrected as shown below:

Column 8, line 16, delete "circuit".
Column 8, line 24, delete "position".
Column 10, line 24, change "fired" to --fixed--.
Column 5, line 43, after "circuit" insert -- No. 75 --.
Column 10, line 43, "driving" should read -- driven --.

Signed and sealed this 2nd day of April 1974.

(SEAL)
Attest:

EDWARD M. FLETCHER, JR.
Attesting Officer

C. MARSHALL DANN
Commissioner of Patents